(12) United States Patent
Mudimela et al.

(10) Patent No.: US 9,949,097 B1
(45) Date of Patent: Apr. 17, 2018

(54) SHARING SIM FUNCTIONALITY BETWEEN DEVICES

(71) Applicant: Amazon Technologies, Inc., Seattle, WA (US)

(72) Inventors: Harinatha Reddy Mudimela, Chennai (IN); James Sushanth Anandraj, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 396 days.

(21) Appl. No.: 14/588,278

(22) Filed: Dec. 31, 2014

(51) Int. Cl.
*H04W 4/16* (2009.01)
*H04M 3/42* (2006.01)
*H04M 3/56* (2006.01)
*H04W 88/06* (2009.01)
*H04W 88/02* (2009.01)

(52) U.S. Cl.
CPC ......... *H04W 4/16* (2013.01); *H04M 3/42059* (2013.01); *H04M 3/563* (2013.01); *H04W 88/02* (2013.01); *H04W 88/06* (2013.01)

(58) Field of Classification Search
CPC ....... H04W 4/16; H04W 88/02; H04W 88/06; H04M 3/42059; H04M 3/563
See application file for complete search history.

(56) References Cited

U.S. PATENT DOCUMENTS

| 2005/0105541 A1* | 5/2005 | Jain | H04Q 3/0045 370/401 |
| 2008/0165024 A1* | 7/2008 | Gretton | G01C 21/3655 340/4.31 |
| 2010/0306335 A1* | 12/2010 | Rios | G06T 17/00 709/211 |
| 2011/0070922 A1* | 3/2011 | Kim | H04M 1/72519 455/558 |
| 2012/0015605 A1* | 1/2012 | Sole | H04W 12/06 455/41.3 |
| 2012/0054353 A1* | 3/2012 | Jung | H04W 88/04 709/227 |

(Continued)

OTHER PUBLICATIONS

Connect your iPhone, iPad, iPod touch, and Mac using Continuity, retreived on Dec. 9, 2014 at <<http://support.apple.com/en-ie/HT6337>>, Apple Inc., Nov. 21, 2014, 7 pgs.

*Primary Examiner* — Kashif Siddiqui
(74) *Attorney, Agent, or Firm* — Lee & Hayes, PLLC

(57) ABSTRACT

Various implementations provide techniques and devices for a donor device to allow a beneficiary device to use a subscriber identity of a donor subscriber identification module ("SIM") card when the donor SIM is coupled and to and active on the donor device. In an implementation, the donor device receives a request from the beneficiary device to communicate using the donor SIM. In some implementations, the request is sent via a donor application installed on both the donor device and beneficiary device. If the request is acceptable, the donor device establishes a wireless telephone call via a wide-area network ("WAN") on behalf of the beneficiary device and authenticates the wireless telephone call on the WAN using the identity associated with the donor SIM. In some implementations, audio data of the wireless telephone call is encrypted and exchanged via a communication link between the donor device and the beneficiary device.

20 Claims, 10 Drawing Sheets

(56) References Cited

U.S. PATENT DOCUMENTS

| | | | |
|---|---|---|---|
| 2012/0082158 A1* | 4/2012 | Reddy | H04W 80/045 370/389 |
| 2013/0194374 A1* | 8/2013 | Kieft | H04L 67/38 348/14.07 |
| 2014/0248852 A1* | 9/2014 | Raleigh | H04M 15/723 455/407 |
| 2015/0003432 A1* | 1/2015 | Tanaka | H04W 76/021 370/338 |
| 2015/0237641 A1* | 8/2015 | Sahu | H04W 72/10 370/315 |
| 2015/0341827 A1* | 11/2015 | Bae | H04W 28/08 370/235 |
| 2016/0174199 A1* | 6/2016 | Babbitt | H04W 12/08 455/410 |
| 2016/0227404 A1* | 8/2016 | Kollu | H04W 12/06 |

* cited by examiner

SHARING SIM FUNCTIONALITY BETWEEN DEVICES

BACKGROUND

The use of mobile communication devices capable of managing multiple subscriber identification module ("SIM") cards is increasingly common. For example, dual-SIM-dual-active ("DSDA") devices allow two SIMs to be active simultaneously on the device. When two SIMs are active in a DSDA device, the device can simultaneously and separately transmit and receive data relevant to the separate subscriber identities of each SIM and even manage two mobile telephone calls simultaneously. Devices capable of managing even more SIMs (e.g. tri- and quad-SIM phones) are already available.

At the same time, many users also use electronic devices (e.g. tablet computing devices, laptop computers, and desktop computers) that often have no mobile telephony capability at all. Other users may find themselves with poor reception or a low balance of mobile calling minutes. Accordingly, the ability to share SIM subscriber identities and other mobile telephony functionality of multi-SIM-multi-active devices would be valuable to consumers.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
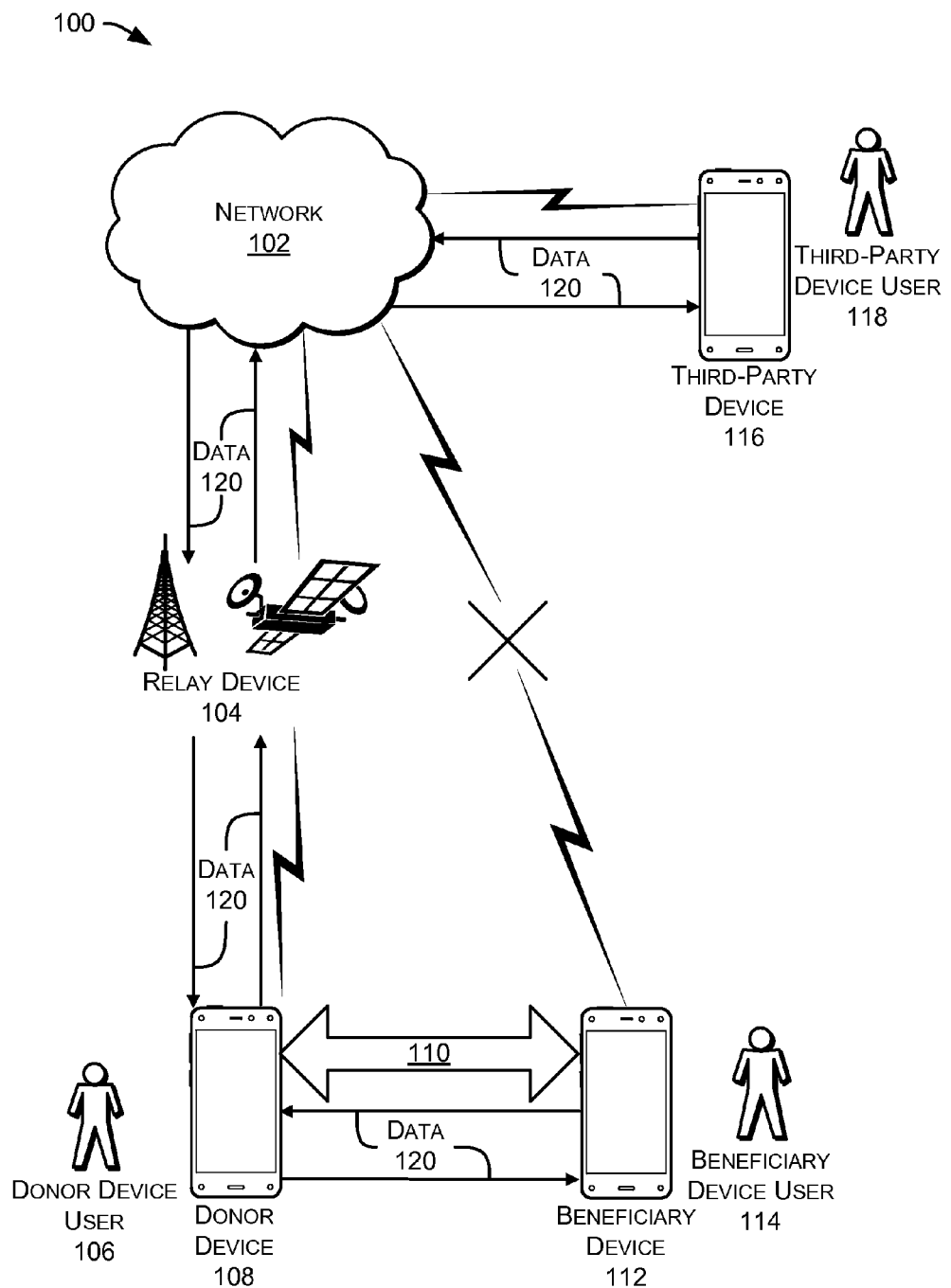
FIG. 1 shows a system wherein a donor device exchanges data directly with a beneficiary device and separately with a network via a relay device.

Described herein are systems and processes to allow a beneficiary device to use a subscriber identity of a subscriber identification module ("SIM") card when the SIM is coupled to a donor device.

The increasing prevalence of dual-SIM-dual-active and other multi-SIM-multi-active electronic devices creates an opportunity to share with a beneficiary device the functionality of some or all of the SIMs installed on a donor device. For example, the user of a beneficiary device may request to place a call using the identity associated with a donor SIM installed on a donor device. There are many reasons a user of a beneficiary device might make such a request—for example, if the beneficiary device has access to a microphone and speaker(s) but not a modem suitable for placing a mobile telephone call (e.g. many tablet or laptop computers); if the beneficiary device is experiencing poor reception or malfunction of its modem; or if the beneficiary's mobile calling minutes or data allowance is low or depleted.

In some implementations, a request to place a call using the identity associated with a donor SIM installed on a donor device may be generated via a donor application installed on the beneficiary device. For example, a user of a beneficiary device may open a donor application on the beneficiary device and broadcast a request to use a donor SIM. In some implementations the donor application or another module operating on the beneficiary device may automatically generate such a request based on pre-defined conditions being met (e.g. reception is poor for an extended period of time). In other implementations, a beneficiary device may provide native hardware or other functionality for automatically or manually generating requests to use a donor SIM.

The user of the beneficiary device may choose to send the request to a particular donor device or donor device user or set of donor devices or donor device users. In some implementations, a list of possible donor devices or donor device users may be maintained. For example, a list of potential donor devices or users of potential donor devices may include users and/or devices which have previously accepted requests from the beneficiary device or the user of the beneficiary device, or potential donor devices and/or users of potential donor devices who have pre-approved requests from the beneficiary device or user of the beneficiary device. In some implementations, users of potential donor devices may submit general availability, e.g. for particular groups, individuals, geographic areas, times of day, or days of the week.

When a beneficiary device or the user thereof requests to use functionality of a donor SIM of a donor device, the request may be a request to use any available donor SIM. In other situations, the request may include further detail. For example, a request to use functionality of a donor SIM may specify a particular SIM or any SIM configured to function on a particular network. For example, if a beneficiary device is experiencing poor wireless reception with a particular network, it may request to use a donor SIM on a network believed or known to offer better reception in the beneficiary device's location, or the beneficiary device may request to use a donor SIM on any network other than the network on which the beneficiary device is experiencing poor reception.

When a donor device receives a request from a beneficiary device to place a call using an identity associated with a donor SIM installed on a donor device, the request may be automatically or manually accepted, rejected, or accepted with conditions. For example, a user of the donor device may manually accept a request using a donor application installed on the donor device or other manual functionality configured on the donor device. In other situations, a donor device may be configured to automatically accept a request—for example, the donor application or another module on the donor device may be configured to automatically accept or reject any requests from particular beneficiary devices or users of beneficiary devices, may be configured to automatically accept any request to use a particular SIM, or may be configured to accept or reject particular types of requests based on a wide variety of criteria (e.g. location, type of direct communication connection with the beneficiary device, SIM availability on the donor device, cell phone balance, battery charge status, call time restrictions, the particular network requested, time of day and day of the week, etc.).

In some implementations, a donor device may accept a beneficiary device request with conditions. For example, the acceptance may be limited to a certain SIM or cards, a certain number of calling minutes, a defined number of mobile telephone calls, and other similar criteria. In some implementations, acceptance conditions may be communicated back to the requesting beneficiary device for review and acceptance or rejection by the beneficiary device of the conditions before a mobile telephone call is initiated.

When a request is accepted by a donor device, in some implementations the donor device initiates a mobile telephone call on behalf of the beneficiary device, for example via a wireless WAN. The donor device may use the selected donor SIM to authenticate the subscriber identity on the wireless WAN.

In some implementations, the donor device may receive data necessary to initiate the mobile telephone call via a direct communications link (e.g. Bluetooth, Zigbee, NFC, etc.) between the donor device and the beneficiary device. For example, keypad input data of the beneficiary device representing a telephone number the user of the beneficiary device wishes to call may be sent to the donor device via the direct communications link. In some implementations, other types of keypad input may be transmitted to and used by the donor device. For example, in some implementations a keypad input at the beneficiary device to end the call may be transmitted to the donor device, and the donor device will end the mobile telephone call upon receiving such an input.

Microphone audio input data of the beneficiary device may be sent via the direct communications link to the donor device in some implementations. The donor device may then transmit to the beneficiary device call audio received at the modem of the donor device that is handling the mobile telephone call on behalf of the beneficiary device. Call audio received from the donor device at the beneficiary device may then be processed and output via a speaker or speakers of the beneficiary device.

In some implementations, audio data related to the mobile telephone call may be transmitted across the direct communications link in encrypted form. Encryption and decryption modules may be installed on the donor device and beneficiary device as part of the donor application. In other implementations, encryption and decryption may be performed by other hardware or software modules, or a combination thereof, on the donor and/or beneficiary devices.

The systems and processes described herein can be implemented in a number of ways. Example implementations are provided below with reference to FIGS. 1-7.

FIG. 1 shows a system wherein a donor device exchanges data directly with a beneficiary device and separately with a network via a relay device. In some implementations, the donor device 108 connects to network 102. The network 102 may include any one or combination of multiple different types of networks, such as wide area networks, wireless networks, cable networks, local area networks, personal area networks, the Internet, ad hoc networks, mesh networks, and/or the like. In some implementations, the relay device 104 may provide connectivity to network 102 for the donor device 108. For example, the relay device 104 may provide network access to the donor device 108 according to the International Mobile Telecommunications-2000 standards ("3G network") or the International Mobile Telecommunications Advanced standards ("4G network"). The relay device in some implementations can be, e.g. a radio antenna or satellite. Other implementations may provide a separate source of network connectivity such as a WiFi hotspot.

In some implementations, all or part of the interaction between the donor device 108 and the beneficiary device 112 occurs through a direct communications link 110 without passing through network 102 or relay device 104. For example, a request for the beneficiary device 112 to use a SIM installed on the donor device 108 may be initiated by beneficiary device user 114 and communicated to donor device 108 through communications link 110. Donor device user 106 may then choose to accept or reject the beneficiary device's request and communicate the decision back to beneficiary device 112 via communications link 110. In other implementations, a decision on whether to accept or reject a request by beneficiary device 112 can be handled automatically based on the identity of the beneficiary device user 114 or beneficiary device 112, the availability or lack thereof of active SIM(s) associated with donor device 108, or other system policies. Additional details are explained herein with reference to other figures.

In some implementations, the beneficiary device request may be generated by a donation application installed on the beneficiary device 112, for example by beneficiary device user 114 interacting with the donation application or by pre-determined policies of the beneficiary device 112 or donation application. The beneficiary device request can be communicated to donor device 108, e.g., via direct communications link 110.

Direct communications link 110 between the beneficiary device 112 and donor device 108 may be implemented using, e.g. Bluetooth, Zigbee, NFC, the IEEE 802.11 standard, or other similar existing or future standards. In other implementations, direct communications link 110 may be implemented through another type of wireless or wired local network, through the Internet, via infrared signals, or any other suitable method of passing data between beneficiary device 112 and donor device 108.

In some implementations, the acceptance or rejection of a beneficiary device's request may be generated by a donation application installed on the donor device 108, for example by a donor device user 106 interacting with the donation application or by pre-determined policies of the donor device 106 or donation application. In some implementations, where a beneficiary device request is accepted, additional decisions can be made, such as selecting a donor SIM from available SIMs installed on donor device 106 or assigning limits on the number of calls or minutes on a donor SIM that are to be made available to the beneficiary device 112. The decisions of donor device 108 can be communicated to beneficiary device 112, e.g., via direct communications link 110, through a wireless or wired local network, through the Internet, or the like.

In some implementations, beneficiary device 112 may request to communicate data to third-party device 116 via a donor SIM on donor device 108. If the request is accepted, data 120 can be sent from beneficiary device 112 to third-party-device 116, received at beneficiary device 112 from third-party device 116, or both. In various implementations, data 120 may comprise microphone audio data generated by beneficiary device user 114 or third-party device user 118 speaking into microphones of beneficiary device 112 or third-party device 116, respectively. In some implementations, data 120 may comprise virtually any type of electronic data file. Data 120 may be send from beneficiary device 112 via donor device 108, relay device 104, and network 102 before ultimately reaching third-party device 116. Similarly, data 120 may be sent from third-party device 116 via network 102, relay device 104, and donor device 108, ultimately arriving at beneficiary device 112.

Figure 2:
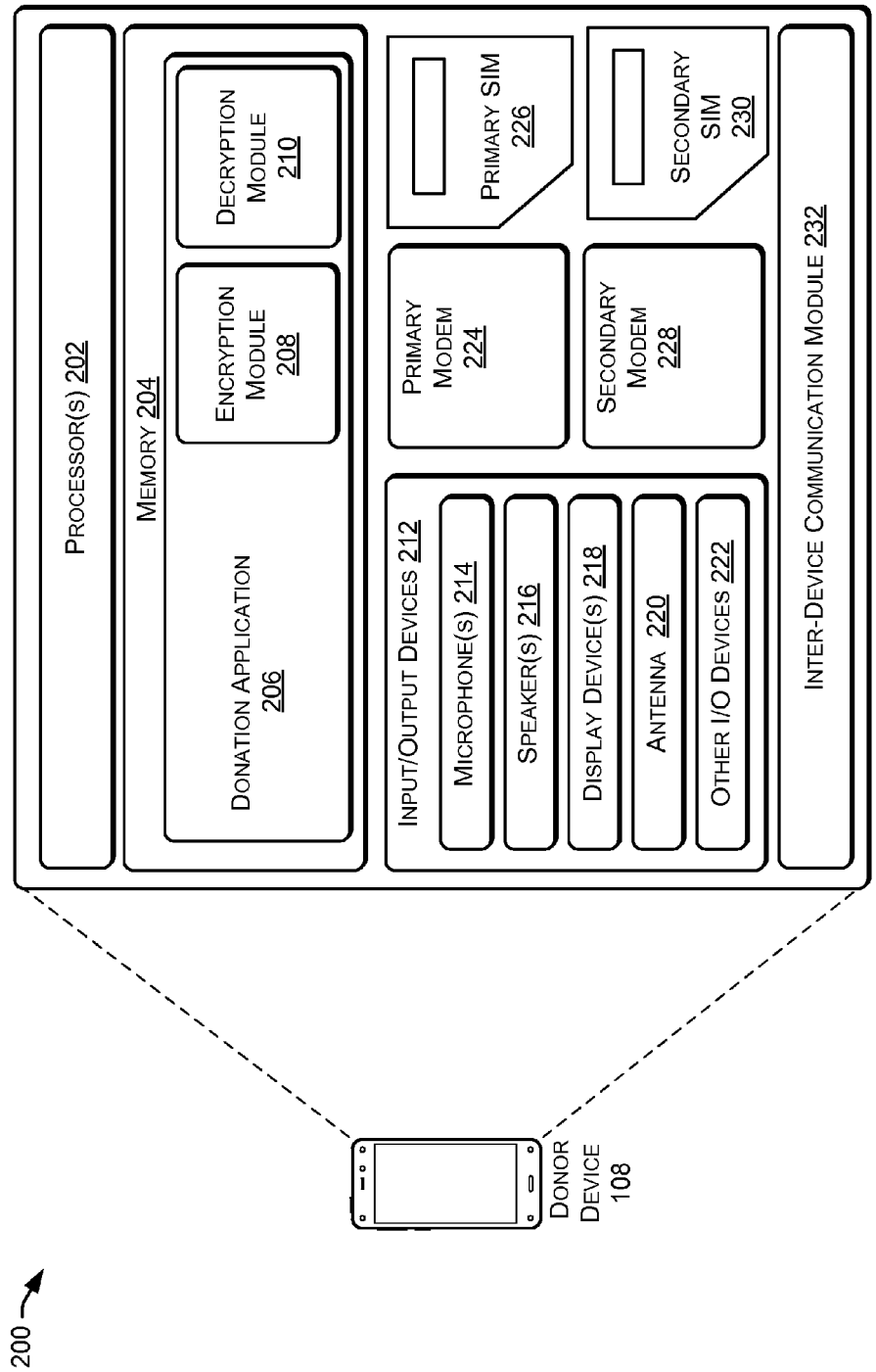
FIG. 2 is a detailed block diagram of an example donor device.

FIG. 2 is a detailed block diagram of an example donor device. The donor device 108 includes one or more processors 202 and a memory 204. The memory may contain a donation application 206 that in turn contains encryption module 208 and decryption module 210. Donor device 108 may also include one or more input and output devices 212. The input/output devices may comprise microphone(s) 214, speaker(s) 216, display device(s) 218, antenna 220, and other input/output devices 222.

The example donor device 108 may also include primary modem 224, primary SIM 226, secondary modem 228, and secondary SIM 230. In other implementations, more than two SIMs and associated modems may be present, and each may be operable in active mode simultaneously with the other SIMs and modems of donor device 108. In some implementations, donor device 108 includes an inter-device communication module 232.

In this example, information received or transmitted via direct communications link 110 of FIG. 1 is received and transmitted by donor device 108 via inter-device communication module 232. Inter-device communication module 232 may be configured to transmit and receive data via any combination of Bluetooth, Zigbee, NFC, the IEEE 802.11 standard, or other similar existing or future standards. In other implementations, inter-device communication module 232 may be implemented through another type of wireless or wired local network, through the Internet, via infrared signals, or any other suitable method of passing data between beneficiary device 112 and donor device 108.

Donor device 108 may receive a request from a prospective beneficiary device 112 for the beneficiary device 112 to communicate using an identity associated with a SIM installed on the donor device. In this example, such a request would be handled by donation application 206 running in memory 204. When donation application 206 receives a request for a beneficiary device 112 to establish a communication using an identity associated with a donor SIM installed on a donor device, the request may be automatically or manually accepted, rejected, or accepted with conditions. For example, donation application 206 may display an interface via display device 218 allowing for a donor device user (106 in FIG. 1) to manually accept, reject, or accept with conditions the beneficiary request.

If donor device user 106 chooses to accept a beneficiary device 112 request with conditions, donation application 206 may provide an additional user interface to allow donor device user 106 to choose the acceptance conditions. For example, donor device user 106 may limit the acceptance to a certain SIM or cards, a certain number of calling minutes, a defined number of mobile telephone calls, and other similar criteria. In some implementations, acceptance conditions may be communicated back to the requesting beneficiary device 112 via inter-device communication module 232 to allow the beneficiary device 112 or a beneficiary device user 114 to review and accept or reject the conditions before a mobile telephone call is initiated.

In some situations, donation application 206 may be configured to automatically accept or reject a request. For example, donation application 206 may automatically accept or reject any requests from particular beneficiary devices 112 or beneficiary device users 114, may automatically accept any request to use a particular SIM, or may automatically accept or reject particular types of requests based on a wide variety of other criteria (e.g. location, type of direct communication connection with the beneficiary device 112, SIM availability on the donor device, the particular network requested, time of day and day of the week, etc.).

After accepting a request for a beneficiary device 112 to communicate using an identity associated with a SIM installed on the donor device, a donor SIM can be selected. In the example of FIG. 2, donation application 206 may be configured to always select secondary SIM 230 as the donor SIM, when available. In other implementations, the donor SIM can be selected based on any combination of predefined criteria (e.g. preferred donation SIM or network, present availability of various SIMs installed in donor device 108, the identity of the beneficiary device or beneficiary device user, etc.) and specific requests of the beneficiary device 112 or beneficiary device user 114 (e.g. a specific SIM, a SIM on a specific network, any SIM not on a specified network, etc.).

In some situations, a donor SIM may be selected before acceptance of a request. For example, the request may designate that only a certain donor SIM is acceptable, the donor device may be configured such that only one particular installed SIM is available for donation, or donation application 206 may select a target donor SIM while it waits for donor device user 106 to decide how to respond to the request, among other scenarios.

After acceptance of a beneficiary device request and selection of a donor SIM, donor device 108 initiates a mobile telephone call on behalf of the beneficiary device 112. In our example, suppose secondary SIM 230 is selected as the donor SIM. Device 108 may initiate a mobile telephone call by configuring secondary modem 228 to communicate via antenna 220 to network 102. Donor device 108 may use the selected donor SIM to authenticate a subscriber identity associated with the donor SIM on network 102. In some implementations, network 102 may be a wireless WAN or may include any one or combination of multiple different types of networks, such as wide area networks, wireless networks, cable networks, local area networks, personal area networks, the Internet, ad hoc networks, mesh networks, and/or the like.

In some implementations, as part of initializing the mobile telephone call, keypad data of beneficiary device 112 may be received via inter-device communication module 232. The received keypad data may define a telephone number to be dialed on behalf of beneficiary device 112. In some implementations, a keypad of donor device 108 (not shown in FIG. 2) may be linked with a keypad of beneficiary device 112 such that the keypad of donor device 108 functions as a "slave" keypad, mimicking the keypad inputs on beneficiary device 112. In other implementations, the telephone number to be dialed on behalf of beneficiary device 112 may be defined elsewhere, for example in the initial request.

In some implementations, data exchanged between donor device 108 and beneficiary device 112 during the mobile telephone call may be transmitted and received in encrypted format. For example, during a mobile telephone call placed on behalf of beneficiary device 112, encrypted microphone data may be received from beneficiary device 112 via inter-device communication module 232, decrypted at decryption module 210, and sent to secondary modem 228.

Likewise, call audio data meant for eventual output at the speaker(s) of beneficiary device 112 may be sent from secondary modem 228 to encryption module 208 for encryption. The encrypted call audio data may then be transmitted via inter-device communication module 232 to beneficiary device 112.

In some implementations, donor device 108 is capable of simultaneously managing as many calls as there are configured modems coupled to donor device 108. For example, donor device 108 may manage a "primary" call on behalf of donor device user 106 using, e.g. primary SIM 226 and primary modem 224, and using microphone(s) 214 and speaker(s) 216. Simultaneously, donor device 108 may manage any number of donor calls as described herein, each on behalf of a different beneficiary device 112.

Figure 3:
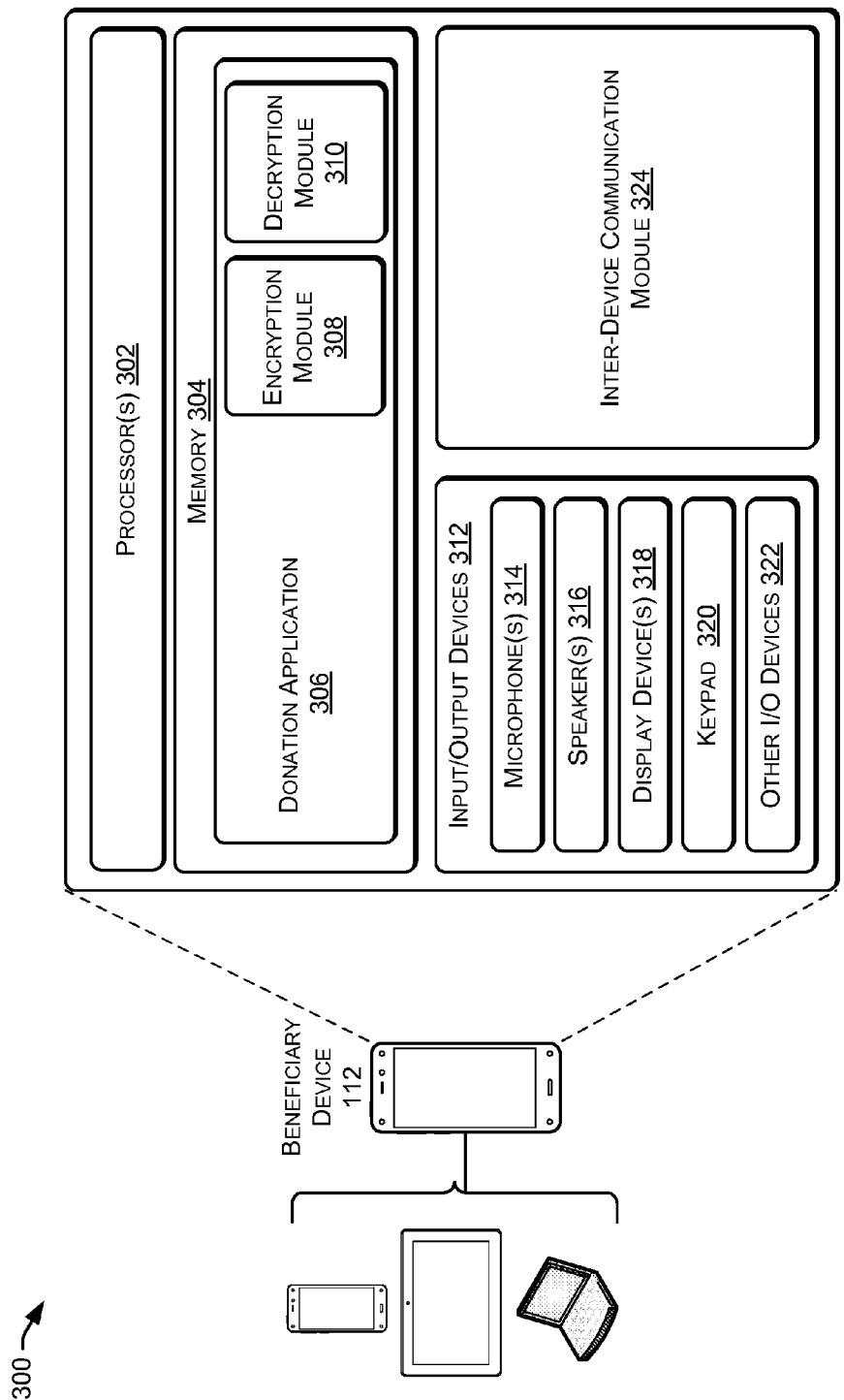
FIG. 3 is a detailed block diagram of an example beneficiary device.

FIG. 3 is a detailed block diagram of an example beneficiary device. The beneficiary device 112 includes one or more processors 302 and a memory 304. The memory may contain a donation application 306 that in turn contains encryption module 308 an decryption module 310. Beneficiary device 112 may also include one or more input and output devices 312. The input/output devices may comprise microphone(s) 314, speaker(s) 316, display device(s) 318, keypad 320, and other input/output devices 322. Beneficiary device 112 may also contain inter-device communication module 324.

Information received or transmitted via direct communications link 110 of FIG. 1 in some implementations is received and transmitted by beneficiary device 112 via inter-device communication module 324. Inter-device communication module 324 may be configured to transmit and receive data via any combination of Bluetooth, Zigbee, NFC, the IEEE 802.11 standard, or other similar existing or future standards. In other implementations, inter-device communication module 324 may be implemented through another type of wireless or wired local network, through the Internet, via infrared signals, or any other suitable method of passing data between beneficiary device 112 and donor device 108.

Beneficiary device 112 may generate a request for the beneficiary device 112 to communicate using an identity associated with a SIM installed on the donor device. In this example, such a request would be generated by donation application 306 running in memory 304. Beneficiary device user 114 may open donation application 306. Donation application 306 may present a donation request interface to beneficiary device user 114 via display device 318. In other implementations, beneficiary device 114 may provide native hardware or other functionality for automatically or manually generating requests to use a donor SIM.

In some implementations, beneficiary device user 114 may define the request in accordance with any choice or combination of choices available within donation application 306. For example, beneficiary device user 114 may choose to send the request to a particular donor device or donor device user, or to a set of donor devices or donor device users. In some implementations, donation application 306 may maintain a list of possible donor devices or donor device users. For example, a list of potential donor devices or users of potential donor devices may include users and/or devices which have previously accepted requests from the beneficiary device or the user of the beneficiary device, or potential donor devices and/or users of potential donor devices who have pre-approved requests from the beneficiary device or user of the beneficiary device. In some implementations, users of potential donor devices may submit general availability, e.g. for particular groups, individuals, geographic areas, times of day, or days of the week.

When a beneficiary device 112 or beneficiary device user 114 requests to use functionality of a donor SIM of a prospective donor device 106, the request may be a request to use any available donor SIM on donor device(s) 106. For example, a request may specify a particular SIM or any SIM configured to function on a particular network. If beneficiary device 112 is experiencing poor wireless reception with a particular network, it may request to use a donor SIM on a network believed or known to offer better reception in the location of beneficiary device 112, or beneficiary device 112 may request to use a donor SIM on any network other than the network on which the beneficiary device is experiencing poor reception.

In some implementations, when a donor device 108 accepts a request of beneficiary device 112 as-is or with conditions, details of the acceptance may be received by beneficiary device 112 via inter-device communication module 324. In some implementations, beneficiary device user 114 or beneficiary device 112 may have an opportunity to approve or reject the terms or details of the donor device's acceptance via donation application 306. Beneficiary device 112 or beneficiary device user 114 may reject the acceptance if, for the terms of the acceptance are not acceptable or the donor device 108 or proposed network are undesirable for any reason. In some implementations, a rejection of the terms of an acceptance by beneficiary device 112 or beneficiary device user 114 may trigger a renewed broadcast of the request using the same or different request details.

When a donor device 108 has accepted a request from beneficiary device 112 and beneficiary device 112 or beneficiary device user 114 have approved the terms of the acceptance, donor device 108 will initiate a mobile telephone call on behalf of beneficiary device 112, as previously described in detail.

In some implementations, as part of initializing the mobile telephone call, data of keypad 320 of beneficiary device 112 may be transmitted to donor device 108 via inter-device communication module 324. The transmitted keypad 320 data may define a telephone number to be dialed on behalf of beneficiary device 112. In some implementations, a keypad of donor device 108 may be linked with keypad 320 of beneficiary device 112 such that the keypad of donor device 108 functions as a "slave" keypad, mimicking the keypad inputs at keypad 320. In other implementations, the telephone number to be dialed on behalf of beneficiary device 112 may be defined elsewhere, for example in the initial request.

In some implementations, data exchanged between beneficiary device 112 and donor device 108 may be transmitted and received in encrypted format. For example, during a mobile telephone call placed by donor device 108 on behalf of beneficiary device 112, encrypted call audio data may be received from donor device 108 via inter-device communication module 324, decrypted at decryption module 310, and sent to speaker(s) 316 for audible output. Likewise, microphone input audio data may be sent do encryption module 308 for encryption. The encrypted microphone data may then be transmitted to donor device 108 via inter-device communication module 324.

Figure 4:
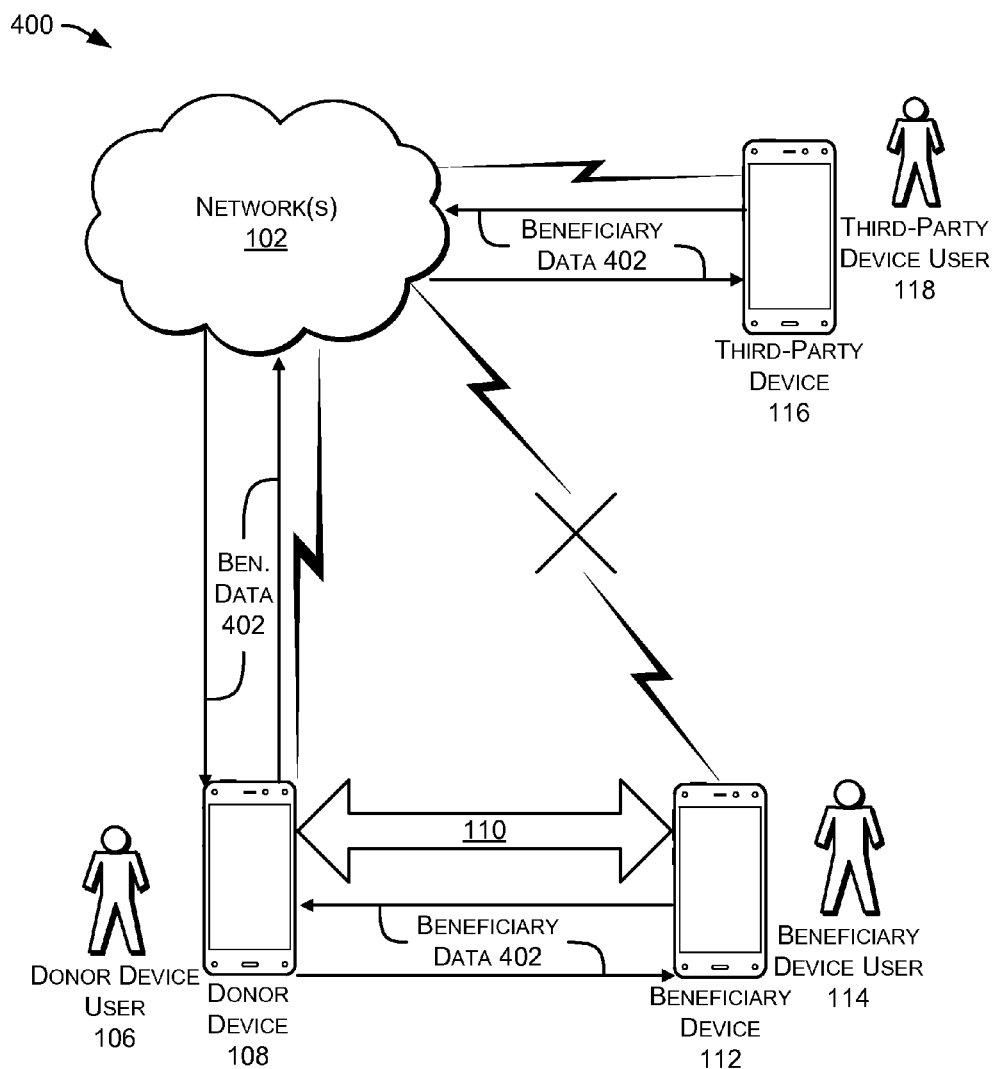
FIG. 4 shows a system wherein a donor device manages communication between a beneficiary device and a third-party device.

FIG. 4 shows a system wherein a donor device manages communication between a beneficiary device and a third-party device. In some implementations, donor device 108 "donates" a donor SIM installed on donor device 108 in order to manage a communication on behalf of beneficiary device user 114. For example, if beneficiary device user 114 wishes to communicate with third-party device user 118 using a donor SIM of donor device 108, donor device user 106 may be prompted to approve donor device 108 managing a communication between beneficiary device 112 and third-party device 116. In this example, donor device 108 may manage a beneficiary communication using elements of donor device 108 described in detail with reference to FIG. 2 (primary SIM 226, primary modem 224 microphone(s) 214, and speaker(s) 216). In some implementations, when a beneficiary communication is managed, beneficiary data 402 is exchanged between beneficiary device 112 and third-party device 116 via donor device 108 and network 102, without beneficiary device 112 having a direct connection to network 102.

Figure 5:
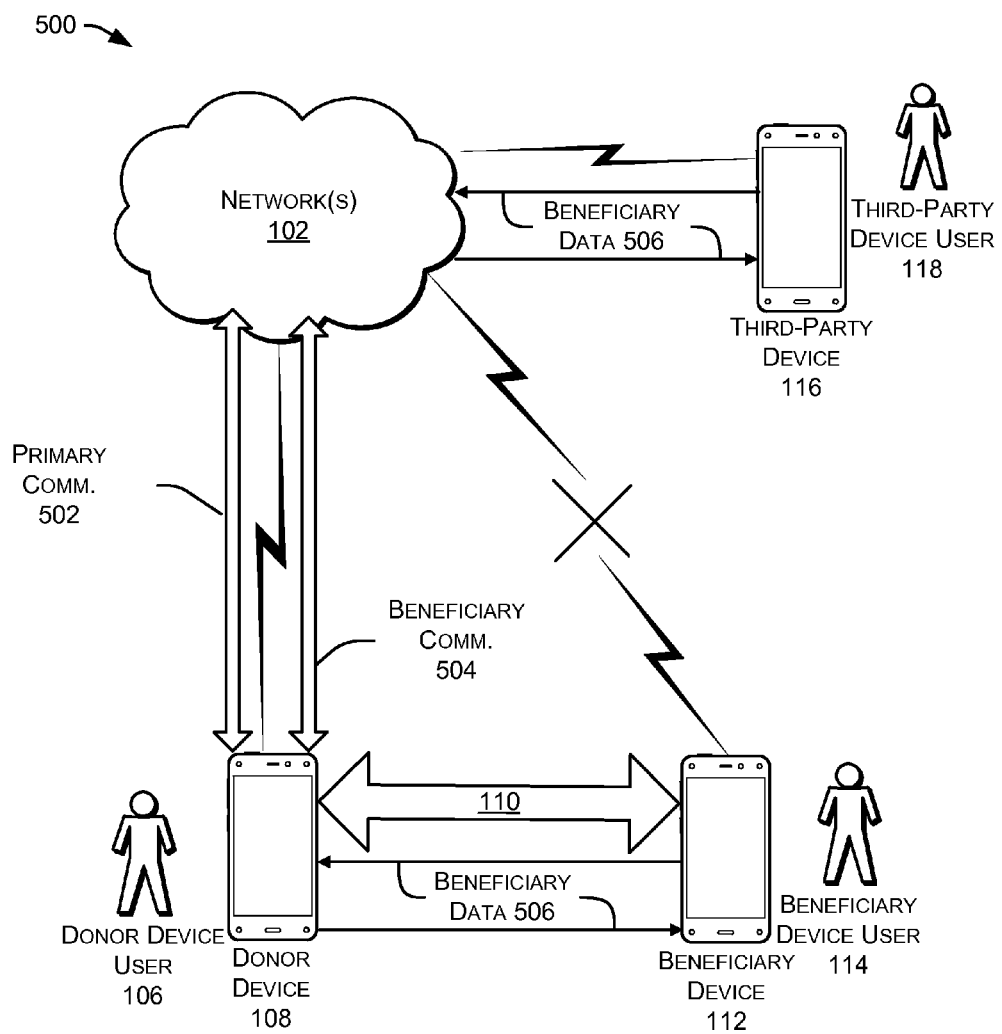
FIG. 5 shows a system wherein a donor device is capable of managing two communications simultaneously, one of which is managed on behalf of a beneficiary device.

FIG. 5 shows a system wherein a donor device is capable of managing two mobile communications simultaneously, one of which is managed on behalf of a beneficiary device. In some implementations, donor device 108 is capable of simultaneously managing as many communications as there are configured modems coupled to donor device 108. In this example, donor device 108 may manage a primary communication 504 on behalf of donor device user 106 using elements of donor device 108 described in detail with reference to FIG. 2 (primary SIM 226, primary modem 224, microphone(s) 214, and speaker(s) 216). Simultaneously, donor device 108 may manage a beneficiary communication 504 using elements of donor device 108 described in detail with reference to FIG. 2 (secondary SIM 230, secondary modem 228, donation application 206, and inter-device communication module 232).

Primary communication 502 and beneficiary communication 504 may be serviced by the same network 102 or by different networks, according to user preferences and the configurations of primary SIM 226 and secondary SIM 230. In this example, beneficiary communication 504 may carry beneficiary data 506. Beneficiary data 506 is communicated from beneficiary device 112 via donor device 108 and network 102, finally arriving at third-party device 116. Similarly, beneficiary data 506 may be communicated from third-party device 116 via network 102 and donor device 108, finally arriving at beneficiary device 112. Additional functions and implementations of donor device user 106, donor device 108, direct communications link 110, beneficiary device 112, and beneficiary device user 114 are presented in detail elsewhere in this disclosure.

Figure 6:
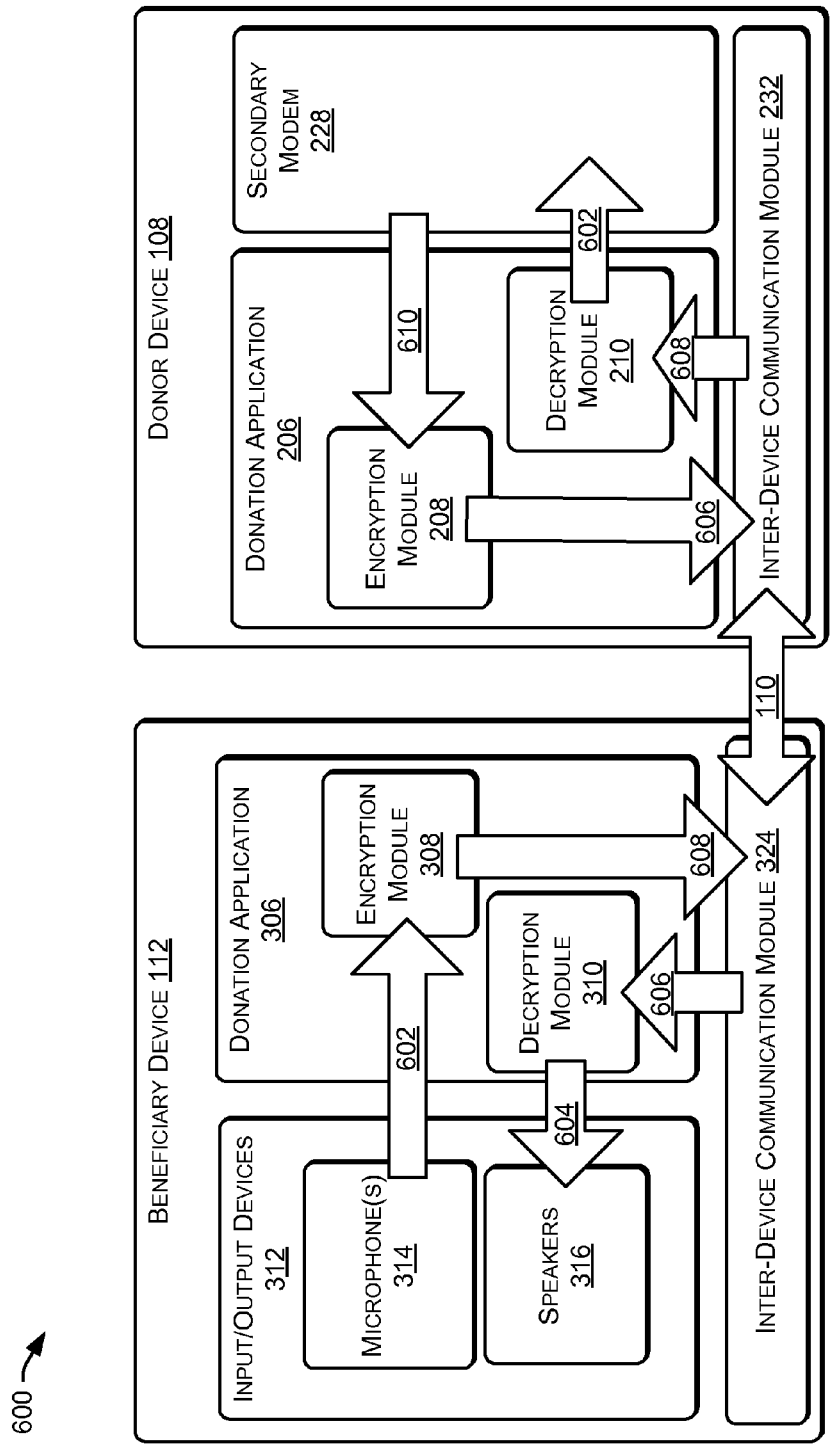
FIG. 6 is a block diagram showing an example system for exchanging encrypted audio data between a donor device and a beneficiary device.

FIG. 6 is a block diagram showing an example system for exchanging encrypted audio data between a donor device and a beneficiary device. In some implementations, data exchanged between beneficiary device 112 and donor device 108 may be transmitted and received in encrypted format. For example, during a mobile telephone call placed by donor device 108 on behalf of beneficiary device 112, microphone audio input 602 from microphone(s) 314 may be sent to encryption module 308. Encrypted microphone data 608 may then be sent to inter-device communication module 324 of beneficiary device 112 for transmission via direct communications link 110 to inter-device communications module 232 of donor device 108. Encrypted microphone data 608 may then be sent to decryption module 210, and decrypted microphone audio input 602 relayed to donor modem 228.

In some implementations, unencrypted call audio data 610 is received at secondary modem 228 and sent to encryption module 208 for encryption. Encrypted call audio data 606 may then be sent to inter-device communication module 232 for transmission via direct communications link 110 to inter-device communication module 324 of beneficiary device 112. Encrypted call audio data 606 is then sent to decryption module 310 for decryption and conversion into speaker-ready audio signal 604. Signal 604 may then be relayed to speaker(s) 316 for audible output.

A person having ordinary skill in the art will recognize that many possible encryption methods and algorithms are readily available for implementing the encryption described herein, and that an encryption method may be selected that is compatible with the communication method(s) or combination of methods used to implement direct communications link 110 in any particular system. For example, current Bluetooth specifications require AES encryption, which is compatible with both IEEE 802.11 and NFC. As a further example, current ZigBee networks are typically secured by 128-bit symmetric encryption keys.

FIGS. 7-10 are flow diagrams illustrating example processes described herein. The processes are illustrated as a as a collection of blocks in a logical flow diagram, which represents a sequence of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 7:
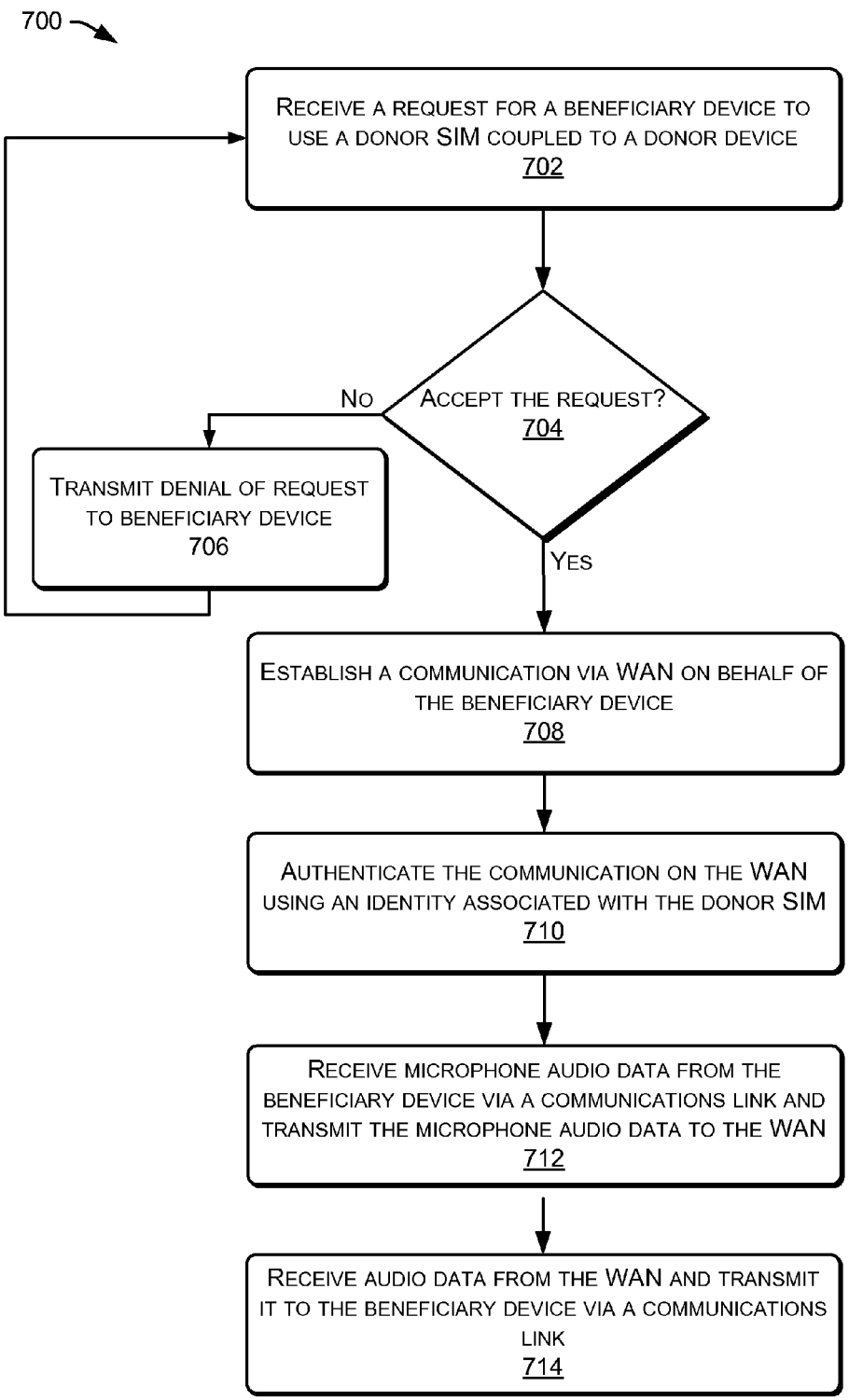
FIG. 7 is a flow diagram of an example process for a donor device to share a SIM subscriber identity and mobile telephony capability with a beneficiary device.

FIG. 7 is a flow diagram of an example process for a donor device to share a SIM subscriber identity and mobile telephony capability with a beneficiary device. At 702, the process includes receiving a request for a beneficiary device to use a donor SIM coupled to a donor device. In some implementations, the request may be received via a direct communications link between a donor device and a beneficiary device and/or via a donation application. In other implementations, the request may received via the Internet, Wi-Fi or any other suitable communication standard.

At 704, process 700 includes deciding whether to accept or reject the request. If the request is rejected, a denial of request is transmitted to the beneficiary device at step 706. If the request is accepted, the process proceeds to step 708. In some implementations, the request may be automatically or manually accepted, rejected, or accepted with conditions. For example, a user of the donor device may manually accept a request using a donor application installed on the donor device or other manual functionality configured on the donor device.

In other implementations, a donor device may be configured to automatically accept a request—for example, the donor application or another module on the donor device may be configured to automatically accept or reject any requests from particular beneficiary devices or users of beneficiary devices, may be configured to automatically accept any request to use a particular SIM, or may be configured to accept or reject particular types of requests based on a wide variety of criteria (e.g. location, type of direct communication connection with the beneficiary device, SIM availability on the donor device, the particular network requested, time of day and day of the week, etc.).

At 708, process 700 includes establishing a communication on behalf of the beneficiary device. In some implementations, the communication may be established via a wireless WAN. In some implementations, the donor device may receive data necessary to initiate the communication via a direct communications link between the donor device and the beneficiary device. For example, keypad input data of the beneficiary device representing a telephone number the user of the beneficiary device wishes to call may be sent to the donor device via the direct communications link.

At 710, process 700 includes authenticating the communication using an identity associated with the donor SIM. In some implementations, identification and authentication details associated with the donor SIM are transmitted to the WAN in place of the beneficiary device or beneficiary device user's own credentials.

At 712, process 700 includes receiving microphone audio data from the beneficiary device via a direct communications link and transmitting the microphone audio data to the WAN. In some implementations, audible sounds of the user of the beneficiary device speaking may be captured at a microphone of the beneficiary device and transmitted via the direct communications link to the donor device. At the donor device, the microphone input data is sent to the modem of the donor device that is associated with the selected donor SIM, and then relayed to the WAN as if the audio had come directly from the donor device itself. In some implementations, the microphone audio data may be transmitted in encrypted form.

At 714, process 700 includes receiving communication audio data from the WAN and transmitting it to the beneficiary device via the direct communications link between the beneficiary device and the donor device. In some implementations, call audio data meant to eventually be output by an end receiving device is received from the WAN at the modem of the donor device that is associated with the selected donor SIM. The received call audio is then transmitted via the direct communications link to the beneficiary device. At the beneficiary device, the communication audio data is processed, if necessary, and sent to speaker(s) of the beneficiary device for audible output. In some implementations, the communication audio data may be transmitted in encrypted form.

Figure 8:
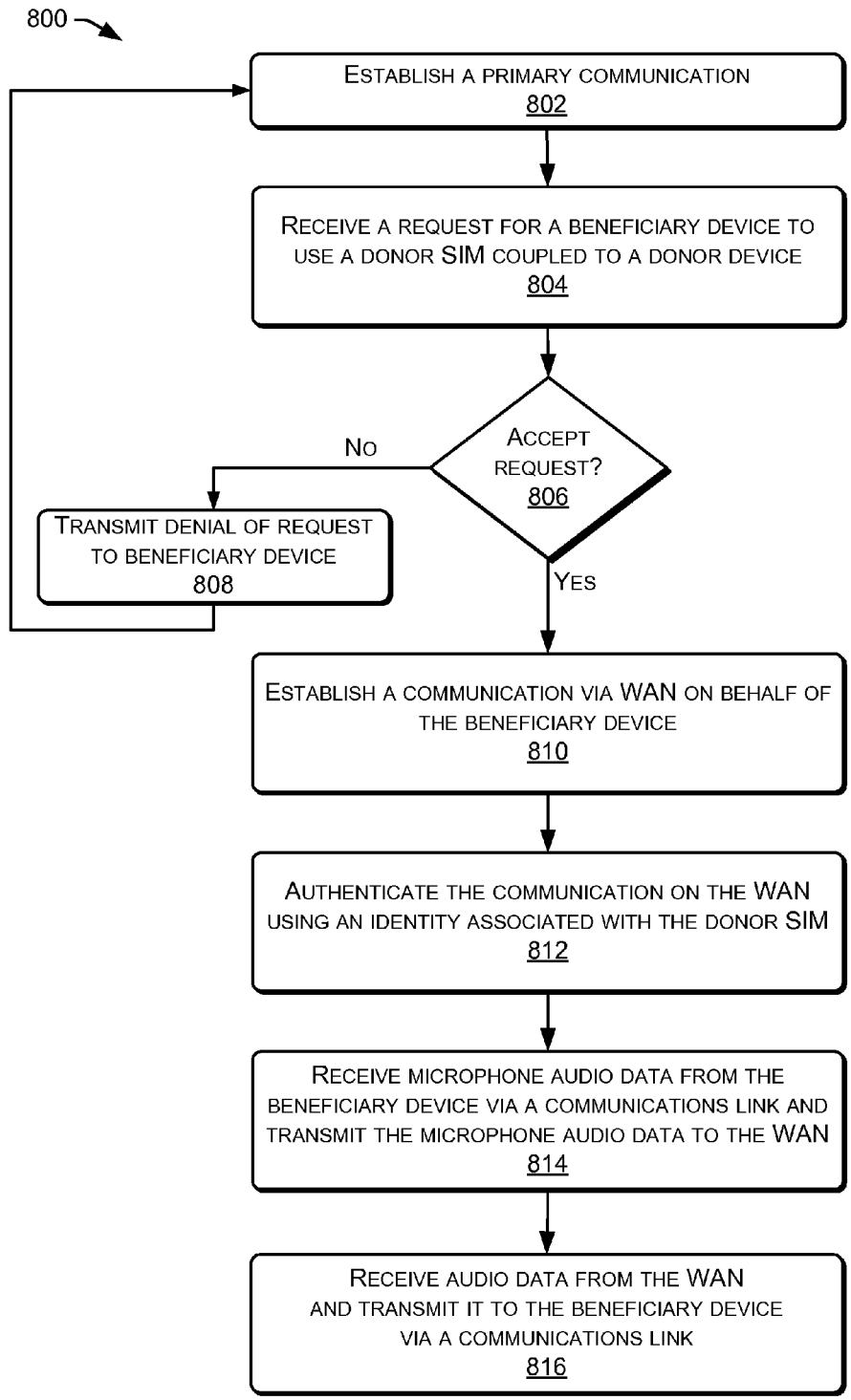
FIG. 8 is a flow diagram of an example process for a donor device to simultaneously manage two communications simultaneously, one of which is managed on behalf of a beneficiary device.

FIG. 8 is a flow diagram of an example process for a donor device to simultaneously manage two communications simultaneously, one of which is managed on behalf of a beneficiary device. At step 802, process 800 includes establishing a primary communication on behalf of a donor device.

At 804, process 800 includes receiving a request for a beneficiary device to use a donor SIM coupled to the donor device. At 806, process 800 includes deciding whether to accept the request. If the request is rejected, a denial of request is transmitted to the beneficiary device at step 808. If the request is accepted, the process proceeds to step 810. In some implementations, a notification of acceptance may also be sent to the beneficiary device, although that step is not explicitly shown in FIG. 8. In some implementations, the request may be automatically or manually accepted, rejected, or accepted with conditions. For example, a user of the donor device may manually accept a request using a donor application installed on the donor device or other manual functionality configured on the donor device.

In other implementations, a donor device may be configured to automatically accept a request—for example, the donor application or another module on the donor device may be configured to automatically accept or reject any requests from particular beneficiary devices or users of beneficiary devices, may be configured to automatically accept any request to use a particular SIM, or may be configured to accept or reject particular types of requests based on a wide variety of criteria (e.g. location, type of direct communication connection with the beneficiary device, SIM availability on the donor device, the particular network requested, time of day and day of the week, etc.).

At 810, process 800 includes establishing a communication on behalf of the beneficiary device and managing the communication simultaneously with the primary communication established at 802. In some implementations, the communication may be established via a wireless WAN. The donor device may receive data necessary to initiate the communication via a direct communications link between the donor device and the beneficiary device. For example, keypad input data of the beneficiary device representing a telephone number the user of the beneficiary device wishes to call may be sent to the donor device via the direct communications link.

At 812, process 800 includes authenticating the communication using an identity associated with the donor SIM. In some implementations, identification and authentication details associated with the donor SIM are transmitted to the WAN in place of the beneficiary device or beneficiary device user's own credentials.

At 814, process 800 includes receiving microphone audio data from the beneficiary device via a direct communications link and transmitting the microphone audio data to the WAN. In some implementations, audible sounds of the user of the beneficiary device speaking may be captured at a microphone of the beneficiary device and transmitted via the direct communications link to the donor device. At the donor device, the microphone input data is sent to the modem of the donor device that is associated with the selected donor SIM, and then relayed to the WAN as if the audio had come directly from the donor device itself. In some implementations, the microphone audio data may be transmitted in encrypted form.

At 816, process 800 includes receiving communication audio data from the WAN and transmitting it to the beneficiary device via the direct communications link between the beneficiary device and the donor device. In some implementations, call audio data meant to eventually be output by an end receiving device is received from the WAN at the modem of the donor device that is associated with the selected donor SIM. The received call audio is then transmitted via the direct communications link to the beneficiary device. At the beneficiary device, the communication audio data is processed, if necessary, and sent to speaker(s) of the beneficiary device for audible output. In some implementations, the communication audio data may be transmitted in encrypted form.

Figure 9:
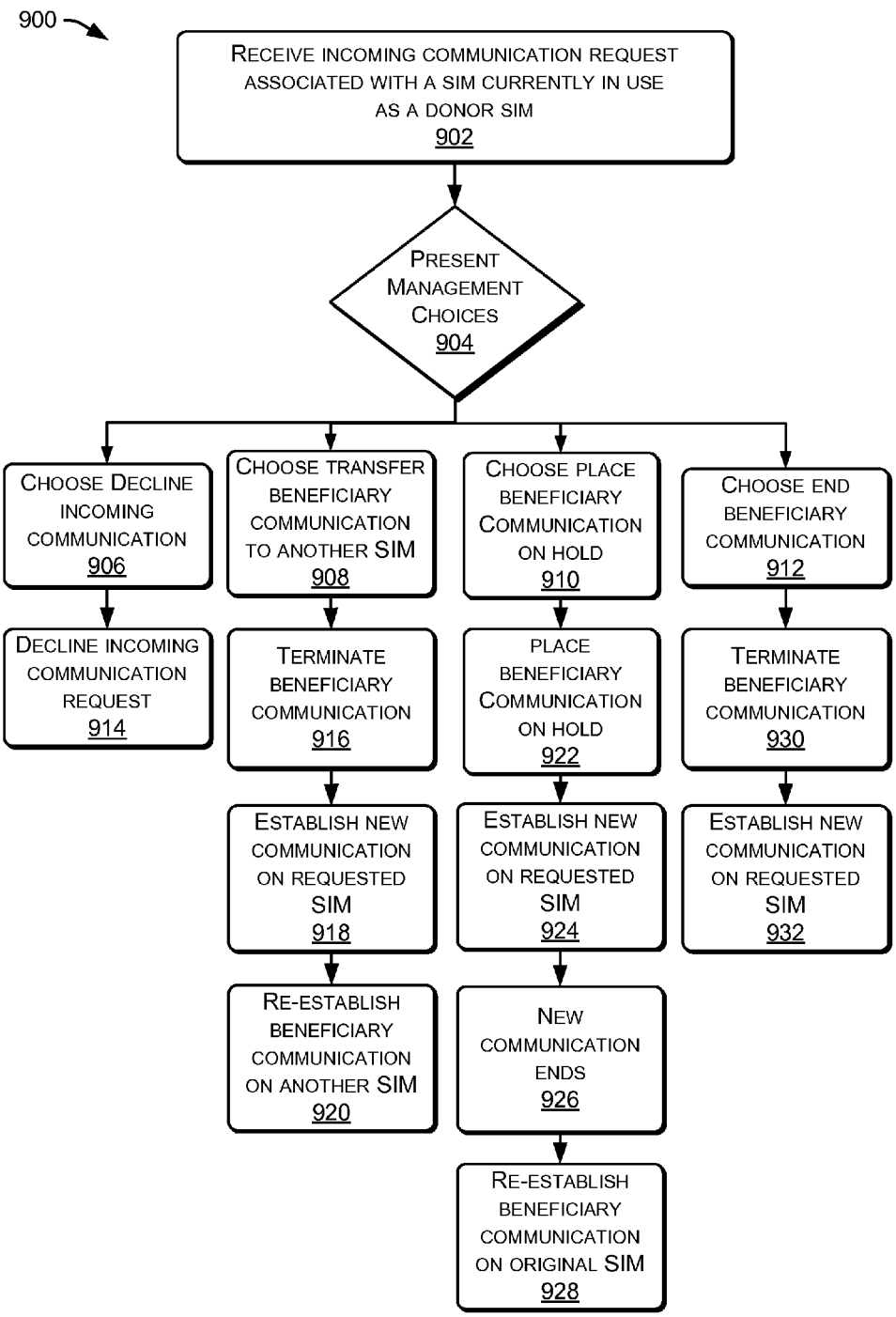
FIG. 9 is a flow diagram of an example process for a donor device to handle an incoming communication associated with a SIM currently being managed on behalf of a beneficiary device.

FIG. 9 is a flow diagram of an example process for a donor device to handle an incoming communication associated with a SIM currently being managed on behalf of a beneficiary device. At 902, process 900 includes receiving an incoming communication request associated with a SIM currently in use as a donor SIM. For example, a donor device may be currently managing a beneficiary communication on behalf of a beneficiary device using a donor SIM. If a third party attempts to contact the donor device using a subscriber identity associated with the donor SIM, a user of the donor device may be presented at 904 with choices for managing the new incoming communication request. In some implementations, the user of the donor device may be presented these options in a donor application interface.

After deciding among the request management choices presented at 904, a user may choose to decline the new incoming communication (906), choose to transfer communication to another SIM (908), choose to place the existing beneficiary communication on hold (910) or choose to end the beneficiary communication (912).

If the user of the donor device chooses to decline the newly requested incoming communication, the new communication is declined at 914. Native or pre-selected device functionality may handle the particular method(s) of declining a communication. For example, in some implementations the incoming communication may be declined in the same manner as a declined mobile telephone call would be declined by the donor device. In other implementations, a message may be sent from a donor application to a device requesting the new communication.

If the user of the donor device chooses to transfer the beneficiary communication to another SIM to allow acceptance of the new incoming communication, the user device must first terminate the beneficiary communication on the donor SIM at 916. The user device may then establish the new communication on the original donor SIM at 918 and select a new SIM for re-establishing the beneficiary communication on another available SIM at 920. In other implementations, the beneficiary communication may be re-established on another available SIM before formally establishing the newly requested communication on the original donor SIM. While the beneficiary communication is temporarily terminated, the separate direct communications link between the donor and beneficiary devices need not be terminated in some implementations.

If the user of the donor device chooses to place the beneficiary communication on hold while the newly requested communication takes place, the user device must first place the beneficiary communication on hold at 922. The user device may then establish the newly requested communication on the donor SIM at 924. When that communication ends at 926, the donor device may then re-establish the beneficiary communication on the original donor SIM at 928. In some implementations, while the beneficiary communication is on hold, the direct communication link between the donor and beneficiary devices may continue to be active.

If the user of the donor device chooses to end the beneficiary communication in order to accept the incoming newly requested communication, the beneficiary communication may be terminated at 930 and the new communication established on the former donor SIM at 932.

Figure 10:
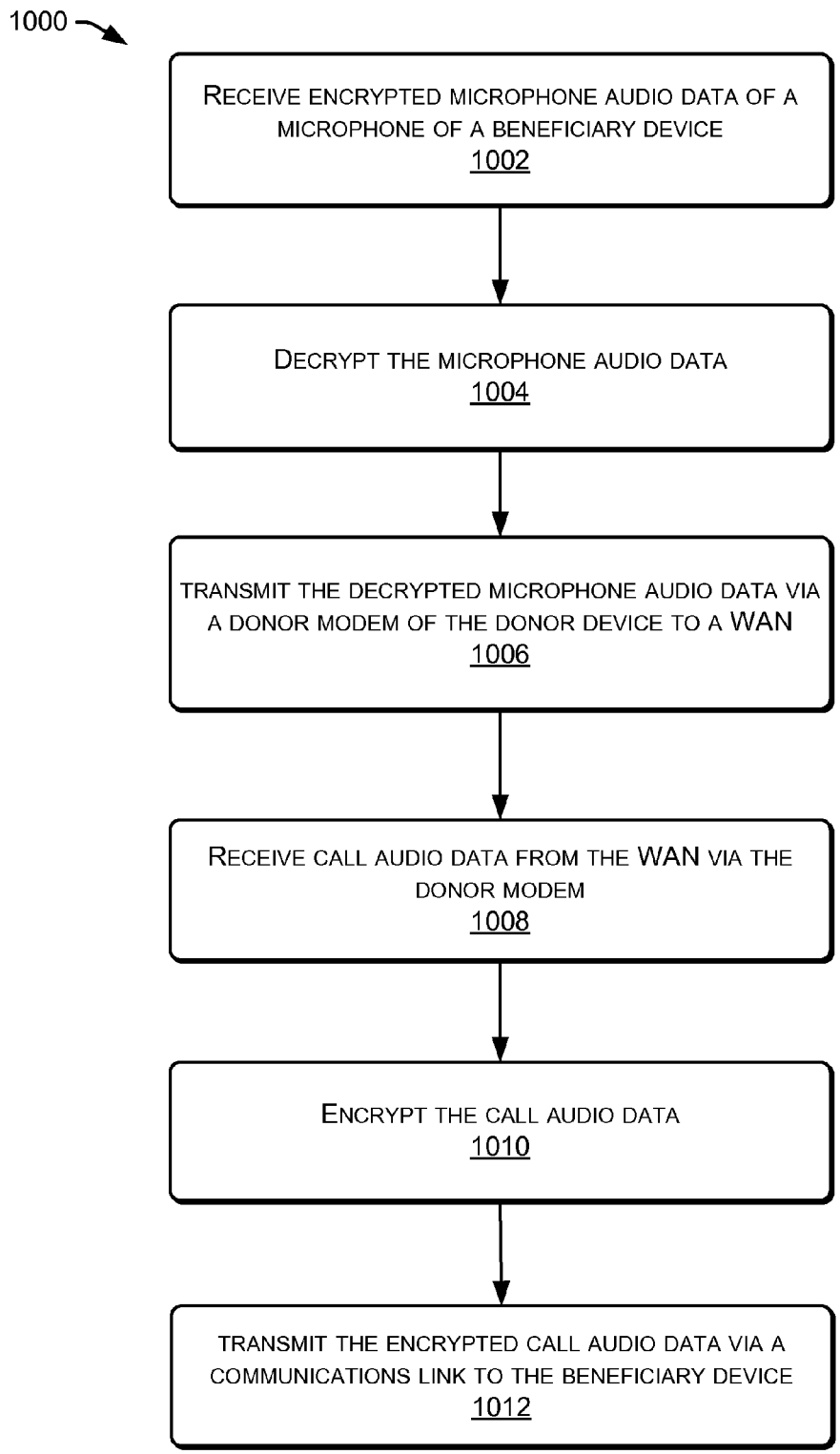
FIG. 10 is a flow diagram of an example process for exchanging encrypted audio data between a donor device and a beneficiary device.

FIG. 10 is a flow diagram of an example process for exchanging encrypted audio data between a donor device and a beneficiary device. At step 1002, process 1000 includes receiving encrypted microphone audio data of a microphone of a beneficiary device. In some implementations, a microphone of the beneficiary device generates audio signals, which are then encrypted by an encryption module of the beneficiary device. The encrypted microphone audio data is then transmitted via a direct communications link from the beneficiary device to the donor device.

At step 1004, process 1000 includes decrypting the received microphone audio data. In some implementations, the received encrypted microphone audio data is sent to a decryption module of the donor device for decryption.

At step 1006, process 1000 includes transmitting the decrypted microphone audio data via a donor modem of the donor device to a WAN. In some implementations, a donor device manages a communication via the WAN on behalf of the beneficiary device. The decrypted microphone audio data may be transmitted from the donor device to the WAN via a modem of the donor device that is associated with the selected donor SIM of the donor device.

In some implementations, the particular WAN handing the communication may require encryption. In such an implementation, previously "decrypted" data may be re-encrypted using a protocol compatible with the WAN. In other implementations, if the encrypted microphone data is received in a format compatible with transmission to the WAN, decryption step 1004 may be skipped and, in step 1006, the already-encrypted microphone audio data relayed to the WAN.

At step 1008, process 1000 includes receiving communication audio data from the WAN via the modem of the donor device that is associated with the selected donor SIM of the donor device. In some implementations, the call audio is received unencrypted and sent to an encryption module of the donor device for encryption.

At step 1010, process 1000 includes encrypting the communication audio data at an encryption module of the donor device. In some implementations, the particular WAN handling the communication may require encryption. In such an implementation, if the encryption method of the received communication audio data is compatible with the direct communications link between the beneficiary device and the donor device, the step 1010 may be skipped and the process may proceed directly to step 1012.

At step 1012, process 1000 includes transmitting the encrypted communication audio data via a direct communications link to the beneficiary device.

Although the techniques have been described in language specific to structural features and/or methodological acts, it is to be understood that the appended claims are not necessarily limited to the features or acts described. Rather, the features and acts are described as example implementations of such techniques.

Conditional language such as, among others, "can," "could," "might" or "may," unless specifically stated otherwise, are understood within the context to present that certain implementations include, while other implementations do not include, certain features, elements and/or steps. Thus, such conditional language is not generally intended to imply that certain features, elements and/or steps are in any way required for one or more implementations or that one or more implementations necessarily include logic for deciding, with or without user input or prompting, whether certain features, elements and/or steps are included or are to be performed in any particular implementation.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow charts described herein and/or depicted in the attached figures should be understood as potentially representing modules, segments, or portions of code that include one or more executable instructions for implementing specific logical functions or elements in the routine. Alternate implementations are included within the scope of the implementations described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described implementations, the elements of which are to be understood as being among other acceptable examples. All such modifications and variations are intended to be included herein within the scope of this disclosure and protected by the following claims.

What is claimed is:

1. A mobile phone comprising:
   one or more processors;
   a subscriber identification module ("SIM");
   a modem coupled to the SIM and configured to communicate via a cellular network; and
   one or more computer-readable storage media storing instructions executable by the one or more processors to perform operations comprising:
      receiving, from a beneficiary device, a request to communicate with a third device via the cellular network, wherein the beneficiary device is incapable of communicating with the third device via the cellular network;
      transmitting, to the beneficiary device and based at least in part on receiving the request, one or more conditions that govern acceptance of the request;
      receiving, from the beneficiary device, an indication that the beneficiary device has agreed to the one or more conditions;
      establishing, by the mobile phone via the modem and the cellular network, a voice communication session with the third device using the SIM;
      receiving, by the mobile phone from the beneficiary device, via a direct communication link between the mobile device and the beneficiary device, first voice data;
      transmitting, by the mobile phone to the third device via the cellular network, the first voice data;
      receiving, from the third device via the cellular network, second voice data; and
      transmitting, by the mobile phone via the communication link, the second voice data to the beneficiary device.

2. A method comprising:
   receiving, by a first device, a request from a second device to communicate with a third device using an identity associated with a first subscriber identification module ("SIM"), the first SIM coupled to the first device;
   determining that the first SIM is accessible;
   establishing, by the first device and based at least in part on determining that the first SIM is accessible, via a wireless wide area network ("WAN"), a first communication session between the first device and a third device;
   receiving, by the first device, via a direct communication link between the first and second devices, first data from the second device;
   transmitting, by the first device, the first data to the third device via the first communication session;
   receiving, by the first device, via the first communication session, second data from the third device; and
   transmitting, by the first device, the second data to the second device via the direct communication link.

3. The method of claim 2, further comprising:
   presenting, by the first device, an interface to accept the request for the second device to communicate using the identity associated with the first SIM;
   receiving, by the first device, an input indicative of an acceptance of the request; and
   transmitting, by the first device, a notification to the second device indicative of the acceptance of the request.

4. The method of claim 2, further comprising establishing, by the first device, a second communication session with a fourth device, the second communication session being established using a second SIM coupled to the first device.

5. The method of claim 4, the second communication session being concurrent to the first communication session.

6. The method of claim 2, further comprising selecting, by the first device, the first SIM from a plurality of SIMs coupled to the first device.

7. The method of claim 2, wherein: the first data comprises first voice data corresponding to voice input received at the second device, and
   the second data comprises second voice data corresponding to voice input received at the third device.

8. The method of claim 2, wherein establishing the first communication session further comprises:
   receiving, by the first device via the direct communication link, third data indicative of a series of key-press events on the second device; and
   establishing the first communication session is based at least in part on the third device using the third data, wherein the third data is indicative of a phone number associated with the third device.

9. The method of claim 2, further comprising authorizing the second device to communicate with the third device for a predetermined period of time.

10. The method of claim 2, further comprising authorizing the second device to communicate using the first SIM for a predetermined number of calls.

11. The method of claim 2, further comprising:
    receiving, by the first device from a fourth device, an incoming communication request;
    terminating the first communication session; and
    establishing a second communication session between the first device and the fourth device.

12. The method of claim 11, further comprising:
    establishing, by the first device, a third communication session with the third device using a second SIM associated with the first device; and
    routing data between the second device and the third device using the third communication session.

13. The method of claim 2, further comprising:
    receiving, by the first device from a fourth device, an incoming communication request;
    placing the first communication session in a hold condition; and
    establishing a second communication session between the first device and the fourth device.

14. The method of claim 13, further comprising:
    terminating the second communication session; and
    resuming communication using the first communication session.

15. A mobile device comprising:
    one or more processors;
    a first subscriber identification module ("SIM") card;
    a first modem configured to communicate via a wireless wide area network ("WAN"); and
    a memory storing instructions executable by the one or more processors to perform operations comprising:
       receiving a request for a second mobile device to communicate with a third mobile device using an identity associated with the first SIM card;
       determining that the first SIM card is accessible;

establishing, based at least in part on the first SIM card being accessible, a first communication link with the second mobile device, the mobile device and the second mobile device being in physical proximity;

authorizing the second mobile device to communicate via the first modem using the identity associated with the first SIM card;

receiving, from the second mobile device, first data indicative of key-press events at the second mobile device; and establishing, using the first data, a first communication session between the second mobile device and the third device.

16. The mobile device of claim 15, further comprising establishing or continuing a second communication session between the mobile device and a fourth device.

17. The mobile device of claim 15, the memory storing further instructions executable by the one or more processors to perform operations comprising:

establishing a second communication link between the mobile device and a fourth device in physical proximity to the mobile device;

authorizing the fourth device to communicate using an identity associated with a second SIM card of the mobile device;

receiving second data via the second communication link, the second data indicative of key-press events at the fourth device; and establishing, via the mobile device, a second communication session between the fourth device and a fifth device, the establishing based at least in part on the second data.

18. The mobile device of claim 17, wherein the second communication session is concurrent with the first communication session.

19. The mobile device of claim 15, the memory storing further instructions executable by the one or more processors to perform operations comprising:

presenting, by the mobile device, an interface to accept or reject the request for the second mobile device to communicate using the identity associated with the first SIM card;

receiving, by the mobile device, an input indicative of an acceptance or a rejection of the request; and transmitting, by the mobile device, a notification to the second mobile device indicative of the acceptance or the rejection of the request.

20. The mobile device of claim 15, the memory storing further instructions executable by the one or more processors to perform operations comprising:

receiving, by the mobile device from a fourth device, an incoming communication request;

terminating the first communication session;

establishing a second communication session between the mobile device and the fourth device using the identity associated with the first SIM card; and establishing, by the mobile device, a third communication session between the second mobile device and the third device, the third communication session using an identity associated with a second SIM card coupled to the mobile device.

* * * * *